United States Patent [19]

Yanase et al.

[11] Patent Number: 4,822,272
[45] Date of Patent: Apr. 18, 1989

[54] MANDREL FOR USE IN A MANUFACTURE OF AN ARTICLE MADE OF COMPOSITE MATERIAL

[75] Inventors: Motoaki Yanase; Tatsuya Yamamoto, both of Kakamigahara, Japan

[73] Assignee: Agency of Industrial Science and Technology, Tokyo, Japan

[21] Appl. No.: 108,697

[22] Filed: Oct. 15, 1987

[30] Foreign Application Priority Data

Oct. 17, 1986 [JP] Japan ................................ 61-245362

[51] Int. Cl.$^4$ ............................................. A01J 21/00
[52] U.S. Cl. ..................................... 425/328; 425/384; 425/393; 425/403; 425/436 R; 156/173; 156/175; 156/187; 156/189; 156/446
[58] Field of Search ................................ 425/393–403, 425/182, 383, 412, 436 R, 328, 384, 385; 249/175, 135; 156/173, 175, 446, 187, 189, 140, 141; 264/337; 420/514

[56] References Cited

U.S. PATENT DOCUMENTS

| | | | |
|---|---|---|---|
| 1,344,702 | 6/1920 | McCarty | 425/392 |
| 2,480,426 | 8/1949 | Skoning | 249/135 |
| 3,580,767 | 5/1971 | Barnes et al. | 156/173 |
| 3,785,811 | 1/1974 | Pelzel | 420/514 |

FOREIGN PATENT DOCUMENTS

| | | | |
|---|---|---|---|
| 744907 | 2/1956 | United Kingdom | 264/257 |
| 1225819 | 3/1971 | United Kingdom | 420/514 |

Primary Examiner—Bernard Nozick
Attorney, Agent, or Firm—Kerkam, Stowell, Kondracki & Clarke

[57] ABSTRACT

A mandrel for use in a process for manufacturing an article of a composite material including a thermosetting resin reinforced by fibers. The mandrel is of a hollow cylindrical configuration and adapted to have resin impregnated fibers wound therearound. In the manufacturing process, a heating medium is introduced into the mandrel under an elevated temperature and pressure to heat the composite material to a curing temperature of the resin. The mandrel is made of an alloy having a rigidity under a room temperature but showing a super plasticity under a temperature at which the resin is cured.

5 Claims, 5 Drawing Sheets

MANDREL FOR USE IN A MANUFACTURE OF AN ARTICLE MADE OF COMPOSITE MATERIAL

BACKGROUND OF THE INVENTION

1. Field of the Invention

The present invention relates to a manufacture of an article made of a fiber reinforced resin and more particularly to a mandrel used for the manufacture of such fiber reinforced resin article. More specifically, the present invention pertains to a flexible mandrel used for manufacturing an article of a fiber reinforced resin or a composite material.

2. Description of the Prior Art

In manufacturing an article of a cylindrical hollow shape from a composite material comprising a fiber reinforced resin material, reinforcing fibers impregnated with molten state thermosetting resin are wound around a flexible mandrel and the mandrel is placed in a mould. Then, a liquid is introduced into the mandrel under an elevated temperature and an elevated pressure to heat the resin material in the fibers and apply the mandrel with a moulding pressure. Conventionally, the mandrel used for the process has been made of a rubber material reinforced by a fabric of reinforced fibers, however, there have been inconveniencies in that the mandrel has a relatively low thermal conductivity so that a relatively long time is consumed in heating the resin material in the fibers and that the mandrel has a low rigidity so that it is difficult to maintain the configuration of the mandrel in winding the resin impregnated fibers around the mandrel. It should further be noted that the rubber material has problems in durability under heat and in an environment of oil.

SUMMARY OF THE INVENTION

It is therefore an object of the present invention to provide a mandrel for the manufacture of a hollow article of a composite material, which does not have the problems described above.

Another object of the present invention is to provide a flexible mandrel which has a high thermal conductivity so that the composite material can be quickly heated.

A further object of the present invention is to provide a flexible mandrel which is rigid under a room temperature condition but flexible under a forming condition and has a satisfactory durability.

According to the present invention, the above and other objects can be accomplished by a mandrel made of an alloy which is substantially rigid at a room temperature but shows a super-plasticity at a temperture at which the resin material is cured. More specifically, the mandrel in accordance with the present invention comprises a thin-walled hollow body which is made of an alloy which shows a superplasticity under a condition wherein the resin material impregnated in the reinforcing fibers is cured, the body being provided with port means for introducing and exhausting a medium for heating and pressurising the resin impregnated fibers wound around the mandrel.

An alloy having a super-plasticity produces a deformation under a low stress and shows a very large ductility. The mandrel in accordance with the present invention is made of such super-plastic material so that it is rigid under a room temperature. Therefore, the resin impregnated fibers can be wound around the mandrel with a high dimensional accuracy and without any difficulty even without applying an internal pressure to the mandrel. Under a temperature at which the resin material impregnated in the fibers is cured, the mandrel shows a super-plasticity so that the mandrel is deformed under the pressure introduced into the mandrel to follow the configuration of the shaping surface of the mould. The alloy also has a high thermal conductivity so that the thermosetting resin material in the fibers can be heated quickly. The alloy for the mandrel is further durable to heat and the medium which will be introduced into the mandrel.

The above and other objects and features of the present invention will become apparent from the following descriptions of a preferred embodiment taking reference to the accompanying drawings.

Figure 1:
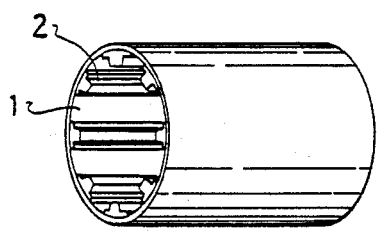
FIG. 1 is a perspective view of an article made of a composite material using a mandrel in accordance with one embodiment of the present invention.
Figure 3:
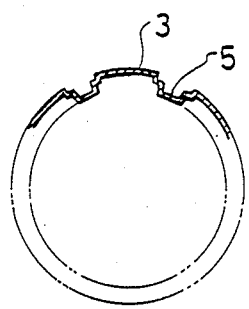
FIG. 3 is a sectional view of the mandrel shown in FIG. 2.

Referring now to the drawings, particularly to FIG. 1, there is shown an example of an article made of a composite material including a thermosetting resin reinforced by reinforcement fibers. The article of the composite material is of a cylindrical configuration having an inner surface attached with longitudinally extending reinforcements 2, each of a hat-shaped cross-sectional configuration. The body 1 and the reinforcement 2 are made of a composite material including a thermosetting resin material reinforced by fibers.

Figure 2:
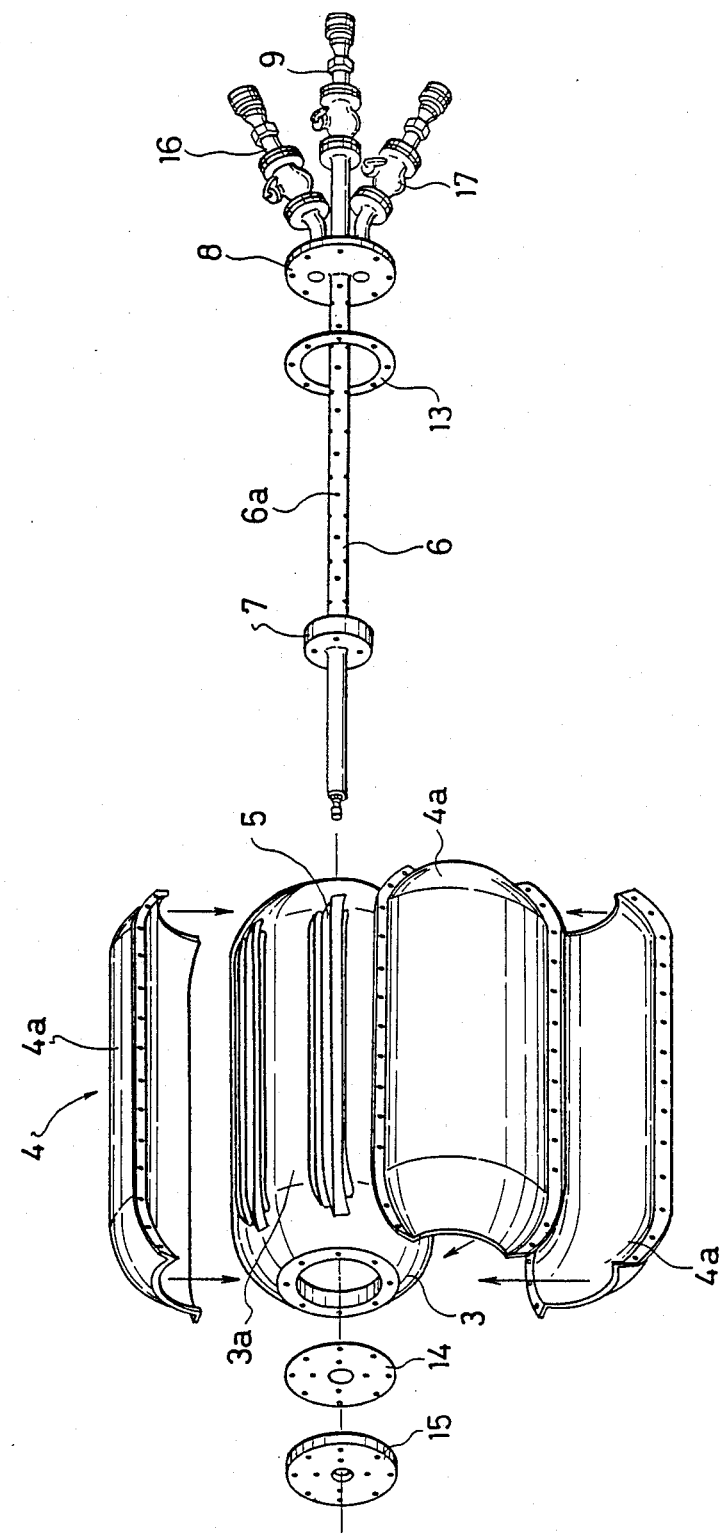
FIG. 2 is an exploded perspective view of a mandrel in accordance with one embodiment of the present invention.

FIG. 2 shows an example of the apparatus for producing the article as shown in FIG. 1. The apparatus includes a mandrel 3 and a mould 4 adapted to be placed around the mandrel 3. The mandrel 3 and the mould 4 are both of cylindrical configurations and the mould is divided into three mould pieces 4a. The mould pieces 4a are connected together at their peripheral flanges by means of bolts to form a single mould 4.

According to the features of the present invention, the mandrel 3 is made of a super plastic alloy which shows a super plasticity under a condition wherein the resin of the composite material is cured. As an example, where the resin is of a type wherein the curing proceeds at a temperature of 180° C., the super plastic alloy may be a zinc based one containing 78% by weight of zinc and 22% by weight of aluminum. The specific alloy described above is substantially rigid under a room temperaure but shows a super plasticity under an elevated temperature at which the resin in the composite material is cured. However, any known type of super plastic alloy may be used.

As shown in FIG. 2, the mandrel 3 has an outer surface 3a which constitutes a forming surface and which is formed with longitudinally extending recesses 5 at circumferential positions corresponding to the reinforcements 2. In the mandrel 3, there is a pipe member 6 having a plurality of perforations 6a. The pipe member 6 is located to extend through the mandrel 3 and is provided at one end portion with an end plate 7 and at the other end portion with an end plate 8. The perforations 6a are formed in the portion of the pipe member 6 between the end plates 7 and 8. The end plate 7 on the pipe member 6 is secured to a disc 15 which is in turn connected with one end of the mandrel 3 through a gasket 14. The end plate 8 is connected with the other end of the mandrel 3 through a gasket 13.

Figure 4:
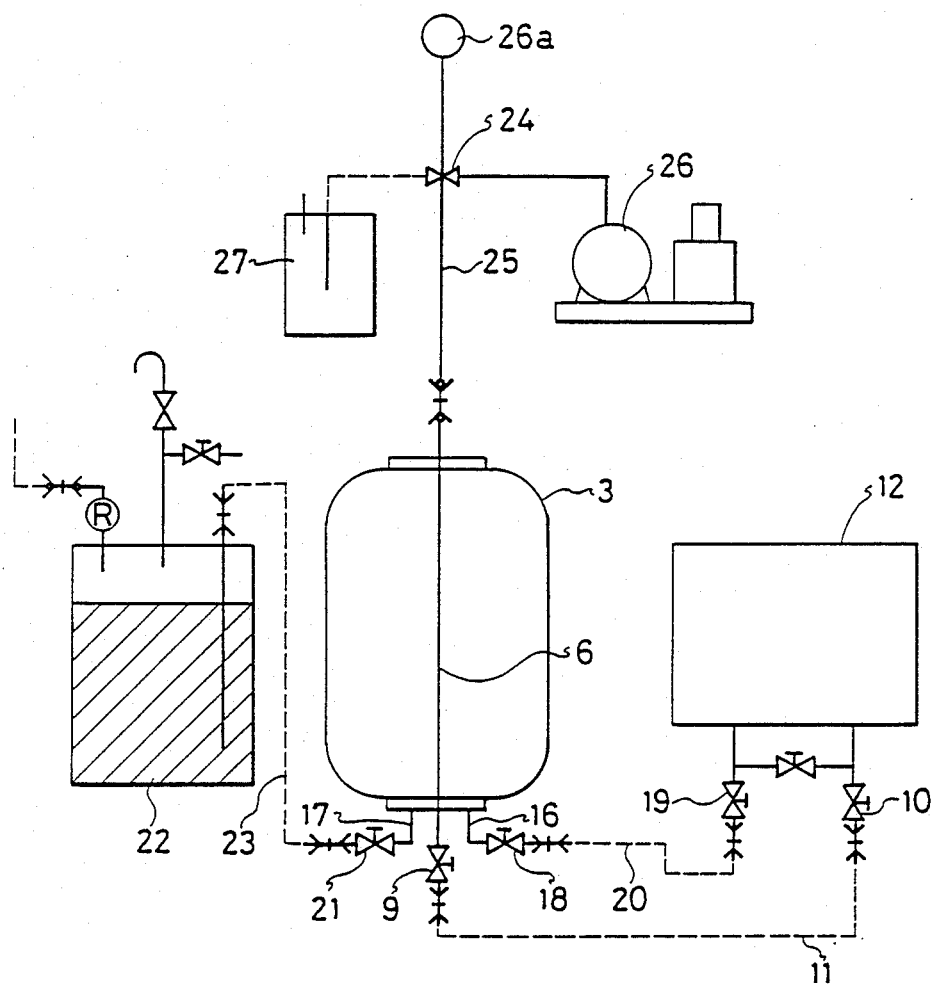
FIG. 4 is a diagrammatical view of a general arrangement of the article forming apparatus using the mandrel shown in FIGS. 2 and 3.
Figure 5:
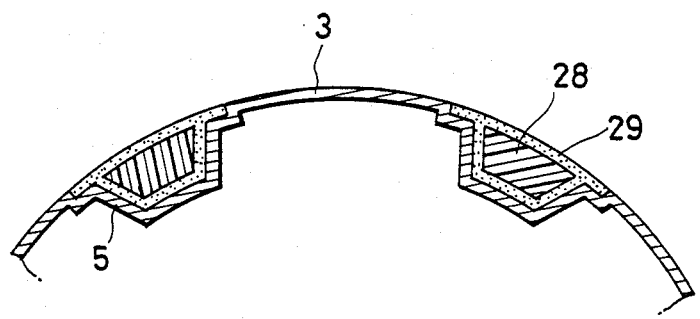
FIG. 5 is a fragmentary sectional view showing the mandrel fitted with reinforcements.
Figure 6:
FIG. 6 is an exploded perspective view showing the manner for attaching the reinforcements to the mandrel; and, FIG. 7 is a perspective view showing the step of winding resin impregnated fibers around the mandrel fitted with reinforcements.
Figure 7:
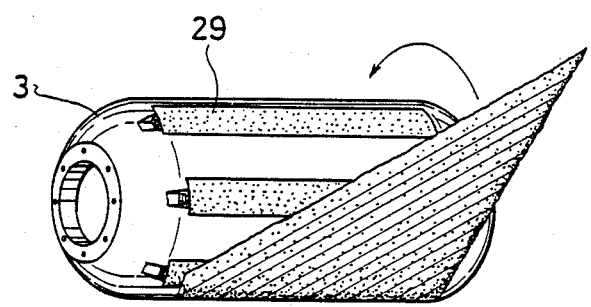

The pipe member 6 has a portion which extends outwardly from the end plate 8 and is connected, as shown in FIG. 4, through a conduit 11 having valves 9 and 10 with a heat transfer unit 12. The end plate 8 is provided with pipe fittings 16 and 17 which are fixed to the end plate 8 so as to open to the inside of the mandrel 3. It will be noted in FIG. 4 that the fitting 16 is connected through a conduit 20 having valves 18 and 19 with the heat transfer unit 12. The fitting 17 is connected through a conduit 23 having a valve 21 with a heating medium tank 22. The pipe member 6 has a portion extending outwardly from the end plate 7 and connected with a conduit 25 having a valve 24. The valve 24 is adapted to connect the conduit 25 alternately with a vacuum pump 26, a compressor 26a or a trap 27.

In operation, a reinforcement 29 is placed in each of the recesses 5 in the mandrel 3. The reinforcement 29 is formed by winding fibers impregnated with a thermosetting resin around a core 28 made for example of Teflon. The reinforcement 29 provides the reinforcement 2 in the article 1 shown in FIG. 1. Thereafter, fibers impregnated with resin are wound around the mandrel 3 and the pipe member 6 is secured to the mandrel 3 as previously described. The mould 4 is then assembled around the mandrel 3 and the conduits 11, 20, 23 and 25 are connected as described. The valve 24 is then operated to connect the conduit 25 to the trap 27 and the valve 21 is opened to introduce the heating medium into the mandrel 3. In this course of operation, the air in the mandrel 3 is expelled from the mandrel 3 through the conduit 25 to the trap 27. When the mandrel 3 is filled with the heating medium, the valves 21 and 24 are closed, and the valves 9, 10, 18 and 19 in the conduits 11 and 20 are opened to make the heating medium circulate under pressure through the heat transfer unit 12. Thus, the mandrel 3 is applied with a heat and pressure which are transmitted to the resin impregnated fibers wound around the mandrel 3. Since the mandrel 3 is made of a super plastic alloy, it shows a flexibility and a high thermal conductivity under this condition. Thus, the resin impregnated fibers wound around the mandrel 3 are suitably formed and the resin in the fibers is cured.

After the forming process, the valves 9 and 18 are closed and the valve 21 is opened. The valve 24 is also operated to connect the conduit 25 with the compressor 26a and compressed air is introduced the mandrel 3. The heating medium is therefore expelled from the mandrel 3 through the conduit 23 to the tank 22. Thereafter, the valve 21 is closed and the valve 24 is operated to connect the conduit 25 to the vacuum pump 26. The mandrel 3 is then evacuated by the vacuum pump 26 to make the mandrel 3 shrink and remove from the article formed in the process described above.

The present invention is advantageous in that the mandrel is made of an alloy which shows a super plasticity under a condition wherein the resin of the composite material is cured. The alloy is substantially rigid under a room temperature so that it is possible to produce the mandrel with a high dimensional accuracy. The mandrel has a high thermal conductivity so that the resin in the composite material can be heated very quickly. The mandrel further has a high durability under heat and the environment of oil which may often be used as the heating medium.

The invention has thus been shown and described with reference to a specific embodiment, however, it should be noted that the invention is in no way limited to the details of the illustrated embodiment but changes and modifications may be made without departing from the appended claims.

We claim:

1. Apparatus comprising a flexible mandrel having an outer forming surface and a mould adapted to be disposed about the mandrel for forming an article of a composite fiber reinforced thermosetting resin by applying heat and pressure to the resin in the mould, the mandrel comprising a hollow body formed of an alloy which becomes super plastic at a predetermined temperature at which the resin cures, the body having port means for introducing into the body a heating and pressurizing medium for heating the body to said predetermined temperature and for deforming the body to press the fiber reinforced resin against the mould to cure the resin and form said article.

2. Apparatus in accordance with claim 1 in which said alloy contains 78% by weight of zinc and 22% by weight of aluminum.

3. Apparatus in accordance with claim 1, wherein said forming surface of the mandrel includes at least one longitudinally extending recess for receiving a longitudinal reinforcement for the article.

4. Apparatus in accordance with claim 1, wherein the alloy is rigid at room temperature and exhibits super plasticity at a temperature of the order of 180° C.

5. Apparatus in accordance with claim 1, wherein the alloy comprises an alloy of zinc and aluminum with the percentage by weight of aluminum being substantially less than that of the zinc.

* * * * *